United States Patent Office 3,452,239
Patented June 24, 1969

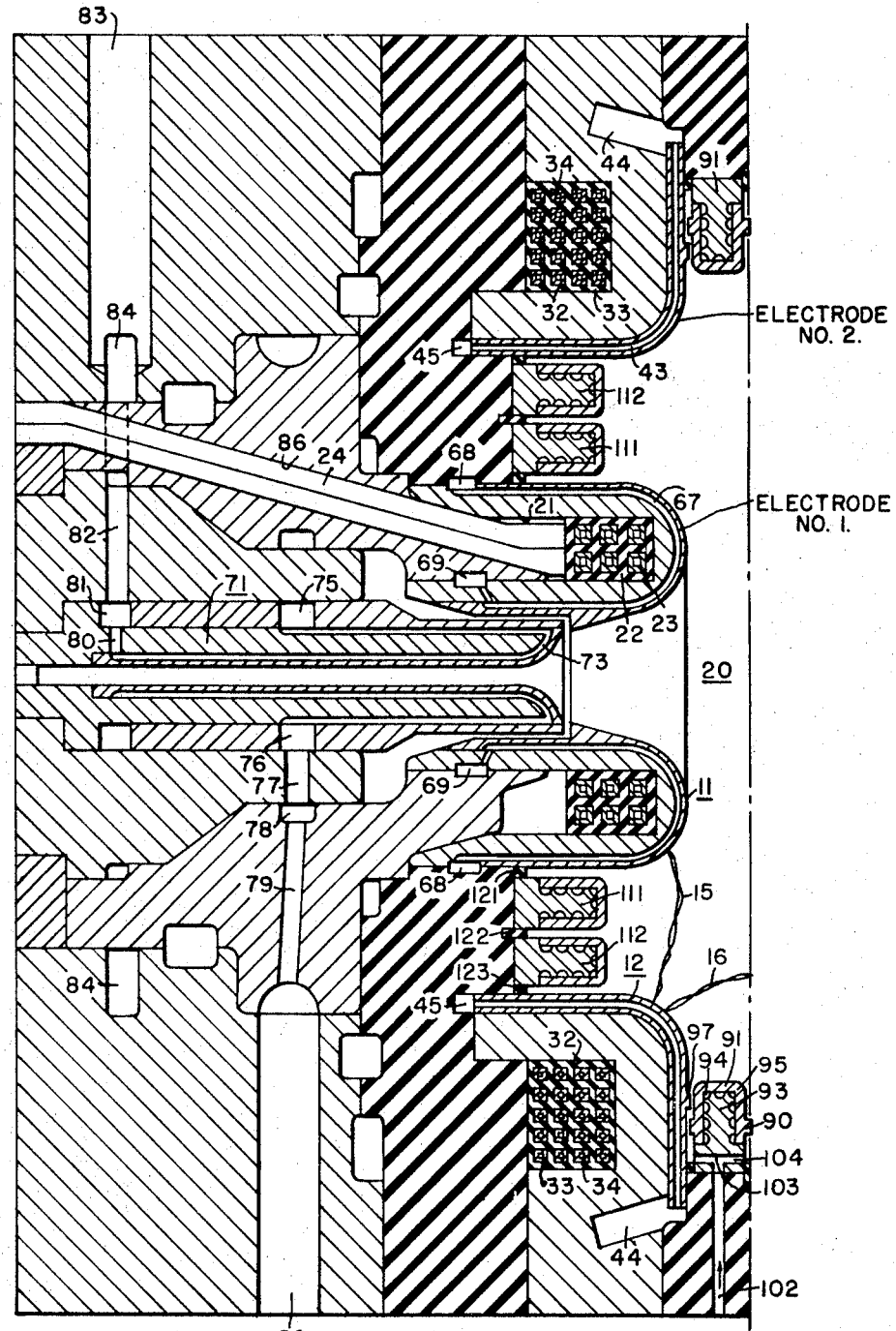
FIG. IA.

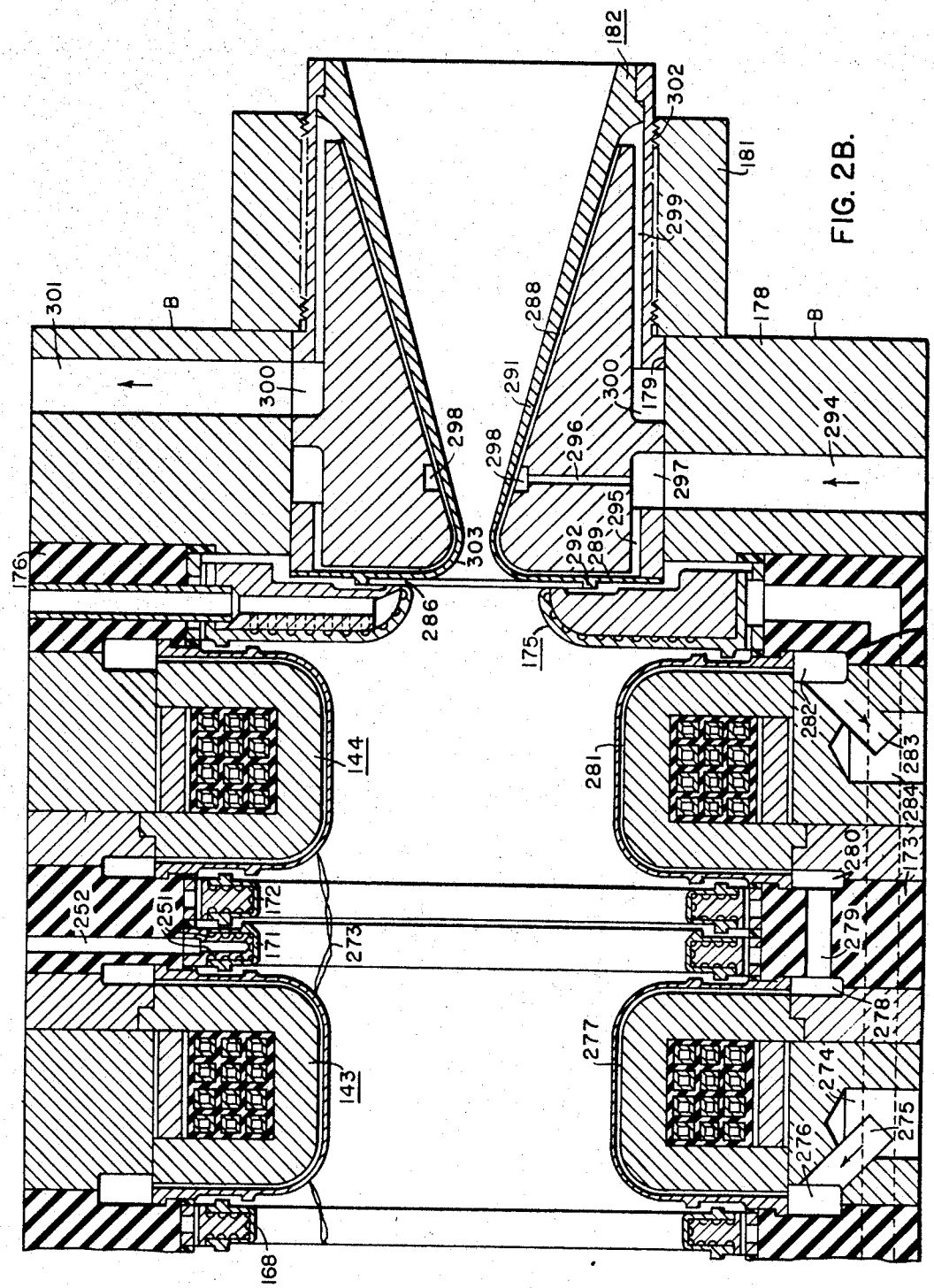

3,452,239
MULTI-ELECTRODE ARC HEATERS
Charles B. Wolf, Irwin, and George A. Kemeny, Export, Pa., assignors to Westinghouse Electric Corporation, Pittsburgh, Pa., a corporation of Pennsylvania
Filed Dec. 5, 1966, Ser. No. 599,032
Int. Cl. H01j 17/26, 61/28
U.S. Cl. 313—231                                            29 Claims

ABSTRACT OF THE DISCLOSURE

A multi-electrode arc-heater is disclosed including two pairs of spaced, coplanar, coaxial electrodes or four spaced coaxially aligned similar electrodes in which all electrodes have field coils therein which may be fluid cooled and in which each electrode is separated from the adjacent electrode by one or more heat shield ring members which are fluid cooled. Air or other gas to be heated is admitted into the arc chamber through spaces between the heat shield members and spaces between the heat shield members and adjacent electrodes and exhausted through a nozzle. The electrodes and nozzle are also fluid-cooled.

---

Figure 1B:
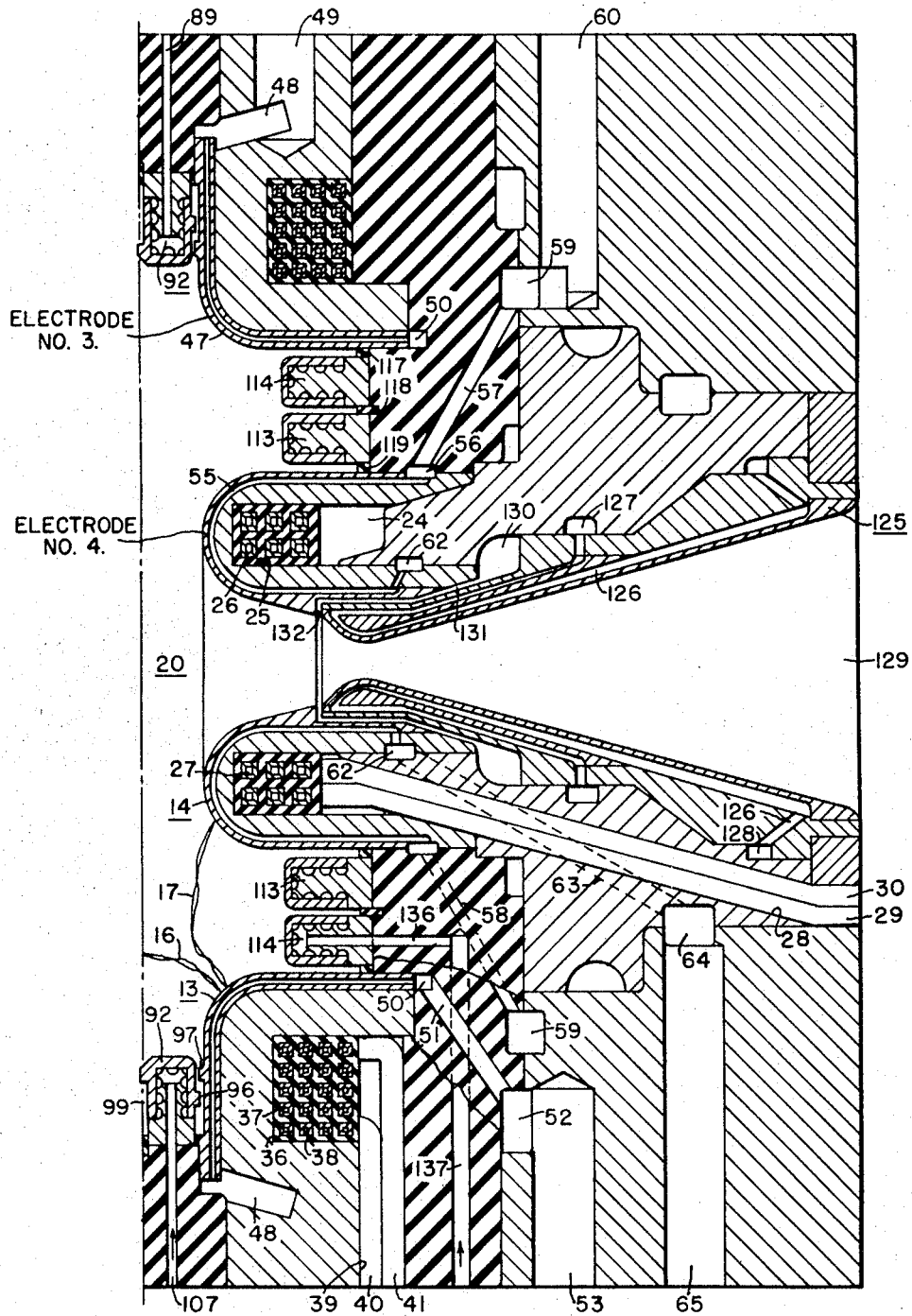

This invention relates to improvements in arc-heaters for heating gases to a high temperature, and more particularly to improved arc heaters employing multiple electrodes for increased heating efficiency and providing other advantages.

In summary, in one embodiment our invention includes a first annular electrode having a field coil disposed therein which upon energization creates a magnetic field to rotate the arc, a second electrode disposed substantially coplanar with the first electrode, and coaxially therewith, the second electrode being of greater diameter, with means for fluid cooling the first and second electrodes, and annular ring heat shield means disposed between the first and second electrodes and spacing the same from each other, with means for admitting gas to be heated into the arc zone between the heat shield members of the heat shield and between the heat shield members and the adjacent electrodes, a third fluid-cooled electrode spaced from the first electrode and mounted coaxially therewith, with heat shield members generally ring-shaped, disposed between the second and third electrodes and including means for bringing fluid cooling to the heat shield members and admitting air or other gas to be heated into the arcing zone in the spaces between the heat shield members and the spaces between heat shield members and adjacent electrodes, and a fourth fluid-cooled electrode spaced from and coaxially aligned with the first electrode, and also coplanar with the third electrode, and including additional annular ring heat shield members between the fourth elecrode and the third electrode, these last-named members being fluid cooled and including means for admitting air or other gas into the arcing zone in the spaces between members. In addition, the arc heater includes a fluid-cooled nozzle through which gas under pressure after being heated to a high temperature is exhausted from the arc heater. All of the electrodes have field coils therein which are energized in a manner to provide fields which rotate the arcs, and the electrodes may be connected to a three-phase source of alternating current to produce three arcs, one arc between the first and second electrodes, one arc between the second and third electrodes, and one arc between the third and fourth electrodes.

In another embodiment of our invention, in summary, four spaced coaxially aligned similar electrodes are provided, each electrode having therein a field coil which may be fluid-cooled, and each electrode being separated from the adjacent electrode by one or more heat shield ring members which are fluid-cooled, and which include means for admitting air or other gas to be heated into the arc chamber through the spaces between heat shield members and the spaces between heat shield members and adjacent electrodes. The second embodiment of our invention also includes means for fluid-cooling the arcing surfaces of the electrodes and fluid-cooling other portions of the wall of the arc chamber exposed to direct radiation from the arc, and in addition fluid-cooled nozzle means is provided for exhausting heated gases from the arc chamber.

Accordingly, a primary object of our invention is to provide new and improved multiple electrode arc heater apparatus.

Another object is to provide new and improved multiple electrode arc heater apparatus employing two pairs of coaxially aligned coplanar electrodes with means for producing three arcs between the four electrodes.

Another object is to provide new and improved multiple electrode arc heater apparatus including four electrodes and having the separation between electrodes adjustable at will by varying the number of heat shield members between each pair of adjacent electrodes.

A further object is to provide a new and improved multiple electrode arc heater employing four electrodes, in which the four direct current field coils are centrally located one in each electrode to produce a field flux direction parallel to the electrode arc contact surface.

Still another object is to provide a new and improved multi-electrode arc heater in which the working fluid, normally air, is introduced between all faces where insulation integrity is required.

An additional object is to provide new and improved multi-electrode arc-heater apparatus in which the same amount of air is directed through each arc, and the cold air passes only once through each arc.

Still a further object is to provide new and improved multi-electrode arc-heater apparatus in which are contact losses per unit area are substantially the same for all electrodes.

An additional object is to provide multiple electrode arc-heater apparatus in which water-cooled electrodes and heat shield members are made removable from the back-up structure so as to reduce replacement cost.

Still a further object is to provide new and improved multi-electrode arc-heater apparatus including means for introducing reagents into the arc heater where the arc heaters are to be used in chemical synthesis.

An additional object is to provide a new and improved multi-electrode arc-heater in which the nozzle is so located as to view little of the actual arc, thereby reducing the radiation the nozzle receives.

Still a further object is to provide new and improved multi-electrode arc-heater apparatus including means for admitting cold air near the nozzle throat, where high pressure, high temperature arc heater operation is required.

Still an additional object is to provide new and improved multi-electrode arc-heater apparatus in which all of the electrodes are identical and all of the heat shield members are substantially identical.

An additional object is to provide new and improved multi-electrode arc-heater apparatus having an increased nozzle exit diameter.

Still an additional object is to provide new and improved multi-electrode arc-heater apparatus in which the electrodes and the heat shields and other structural parts form the pressure vessel of the arc heater proper.

Still an additional object is to provide an arc heater which can utilize directly multi-phase alternating circuit power.

Figure 2A:
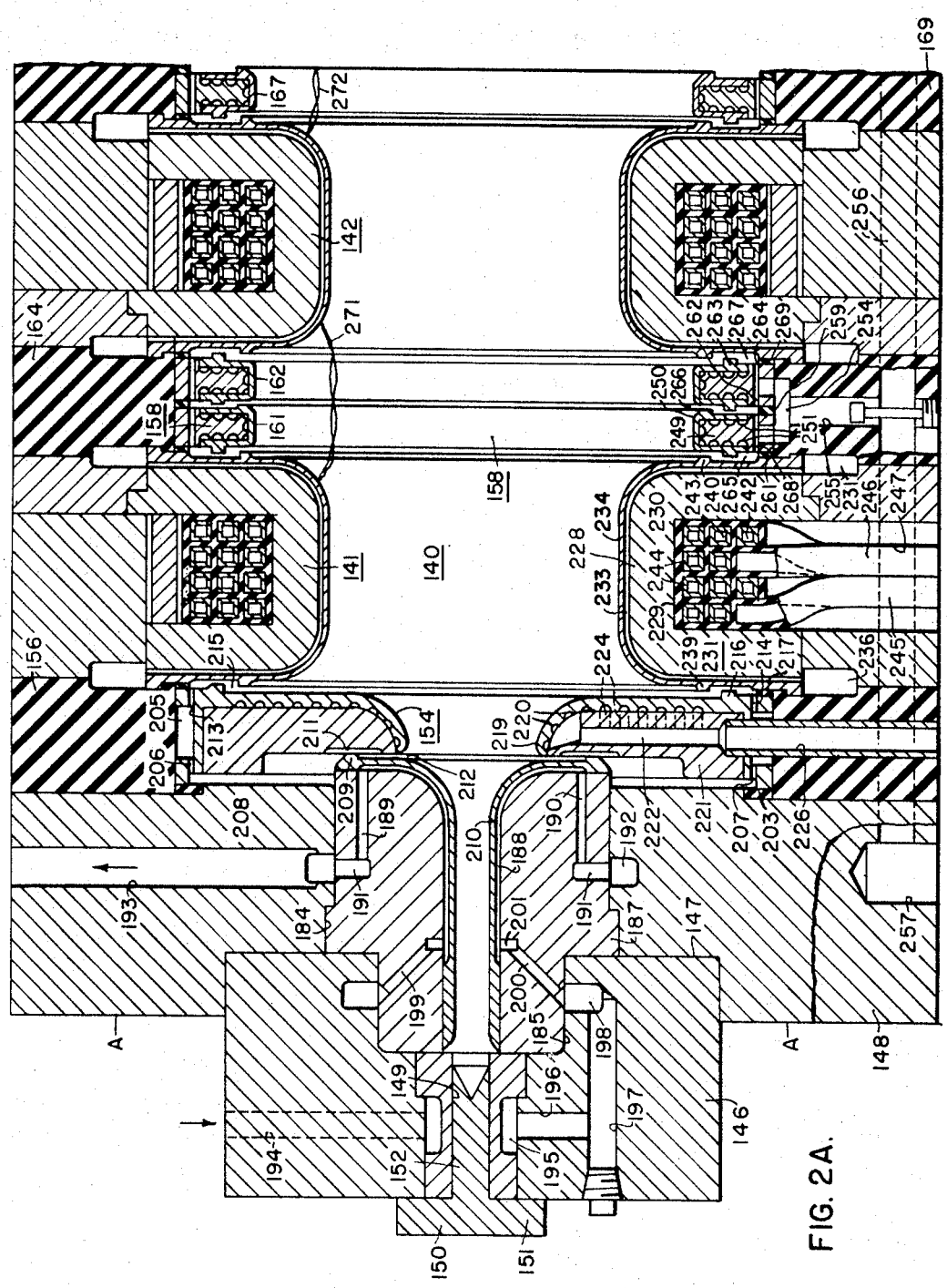

These and other objects will become more clearly apparent after a study of the following specification, when read in connection with the accompanying drawings, in which:

FIGS. 1A and 1B taken together are a cross-sectional view through an arc-heater according to one embodiment of our invention; and FIGS. 2A and 2B taken together are cross-sectional view taken through a multi-electrode arc-heater according to another embodiment of our invention.

Referring now to the drawings for a more detailed understanding of the invention, and in particular to FIG. 1 thereof, the arc-heater is seen to include first, second, third and fourth electrodes generally designated 11, 12, 13 and 14, respectively. Electrodes 11, 12, 13 and 14 are electrically connected by suitable means, not shown for convenience of illustration, to a three-phase alternating current source to produce arc 15 between electrodes 11 and 12, arc 16 between electrodes 12 and 13, and arc 17 between electrodes 13 and 14, all of these arcs occurring within the general arcing chamber 20. It is seen further that electrode 11 is in the form of an annular ring, and that electrode 12 is in the form of an annular ring of larger inside diameter, coaxial with electrode 11 and substantially coplanar therewith and spaced therefrom by heat shield means including two heat shield rings 111 and 112. Electrode 13 is spaced from electrode 12 by heat shield means including two heat shield rings 91 and 92, is of substantially the same diameter and is mounted coaxially therewith. Electrode 14 is of smaller diameter than electrode 13 and spaced therefrom, being coplanar with electrode 13 and concentrically or coaxially mounted with respect to electrode 13 and spaced therefrom by heat shield means including heat shield rings 113 and 114. As previously stated, electrode 11 is in the form of an annular ring, and electrodes 12, 13 and 14 are also in the form of annular rings. Mounted within an annular aperture 21 in electrode 11 is a field coil housing 22 having therein an annular field coil 23. Energizing leads 24 are brought to field coil 23 through passageway 86. The oppositely disposed electrode 14 has an annular passageway or aperture 25 therein in which is disposed a field coil housing 26 composed of electrically insulating material, housing a field coil 27. Leads to the field coil 27 are brought to the coil through passageway 28, the leads being designated 29.

With further reference to the portion of the apparatus including electrodes 11 and 12, electrode 12 is seen to have an annular substantially square in cross-section passageway therethrough, designated 32, having therein a coil housing 33 composed of insulating material enclosing a magnetic field coil 34 the leads to which are not shown in the particular plane selected for the cross-sectional view, but may be similar to the leads to field coil 38 in electrode 13, hereinafter to be described in greater detail.

There is seen to be an annular passageway 36 in the electrode 13 in which is disposed a coil housing 37 composed of an electrically insulating material, housing a magnetic field producing coil 38, and a passageway 39 is provided through the electrode for bringing leads 40 and 41 to the field coil. Whereas field coils 23, 27, 34 and 38 have been shown as conventionally wound coils, preferably they are coils composed of hollow conduit, the turns of which are electrically insulated from each other, and a cooling-fluid flows through the conduit of the coil thereby conducting heat flux away from the coil material. Such a structure is shown in FIGS. 2A and 2B hereinafter to be described in detail.

Electrode 12 is further seen to have a fluid passageway 43 near the surface thereof, the passageway extending around the entire electrode and communicating at one end with a circular passageway 44 which may form either a fluid inlet or a fluid outlet header, and communicating at the other end thereof with a circular passageway 45 which provides either a fluid outlet or fluid inlet header. It will be understood that circular passageway 44 has a fluid inlet or outlet conduit pipe thereto at some point around the circumference of the arc heater, the pipe not being shown in the plane of the cross-section selected for illustration. It will be likewise understood that the circular passageway or fluid header 45 has a fluid inlet or fluid outlet pipe extending therefrom to the outside of the arc-heater in some plane other than the cross-sectional plane selected for illustration.

The aforementioned oppositely disposed electrode 13 has a fluid passageway 47 therein around the entire periphery of the annular electrode, passageway 47 communicating at one end with a fluid header 48 opening into a fluid passageway 49 extending to the outside of the arc heater, and the aforementioned fluid passageway 47 just back of the arcing surface of the electrode communicates at the other end thereof with a fluid header 50 connected by a plurality of peripherally spaced conduits 51 with a fluid manifold 52. It will be understood that the manifold 52 has a fluid passageway thereto from the outside surface of the arc heater. The fluid inlet for manifold 52 is shown at 53.

The aforementioned electrode 14 has a passageway 55, generally U-shaped, and extending around the entire annular electrode near the arcing surface for the flow of a cooling fluid, passageway 55 communicating at the outer end thereof with a circular passageway or fluid header 56 which communicates by a plurality of peripherally spaced conduits two of these being shown at 57 and 58, with a fluid header 59 opening into a passageway 60 which may be either a fluid inlet or a fluid outlet, passageway 60 extending to the outside of the arc heater.

The other end of the aforementioned passageway 55 in electrode 14 terminates in an annular ring-shaped fluid header 62 which communicates by a plurality of peripherally spaced passageways, one of these being shown in dashed-line at 63, with a fluid manifold 64. Manifold 64 has a fluid inlet or outlet passageway 65, depending upon the use to which the aforementioned passageway 60 is put, passageway 65 extending to the outside of the arc heater.

The aforementioned electrode 11 has a generally U-shaped pasageway therein near the arcing surface thereof extending around the entire periphery of the electrode, this passageway being designated 67, the passageway communicating at the outside end thereof with an annular ring-shaped fluid header 68, the passageway 67 communicating at the inside end thereof with an annular ring-shaped fluid header 69. It will be understood that the fluid headers 68 and 69 have fluid inlet or fluid outlet passageways from the outside of the arc heater communicating therewith, these passageways not being shown because they do not occur in the plane selected for cross-sectional illustration.

Disposed within the hollow bore of the annular electrode 11 is an end plug generally designated 71, the end plug 71 also having passageway or passageways 73 therein for the flow of a cooling fluid, passageway 73 communicating at one end thereof with a plurality of peripherally spaced drilled holes, two of these being shown at 75 and 76, hole 76 communicating with passageway 77 which communicates with an annular fluid header 78 which communicates by way of passageways 79 and 80 with the outside of the arc heater. The other end of the aforementioned passageway 73 communicates by way of a series of peripherally-spaced drilled holes 80 with an annular fluid header 81, which fluid header 81 communicates by way of passageways 82, 84 and 83 with the outside of the arc heater. Thereby a complete fluid flow path for conducting fluid to the aforementioned passageway 73 and conducting fluid therefrom after it is used to remove heat flux from the end plug, is completed.

An aforementioned passageway 86 is provided for bringing leads 24 to the field coil 23.

Disposed between the aforementioned electrodes 12 and 13 is a heat shield consisting of two ring members 91 and 92 but which may include a larger or lesser number of ring members if desired. Both of the ring members 91 and 92 may be composed of an inner metallic portion 93 having a plurality of annular passageways therearound, and an outer jacket portion 95 composed of a highly heat-conductive material such as copper. Ring members 91 and 92 have grooves therein into which tongues 97 attached to electrodes 12 and 13 extend to provide optical shielding. One of the ring members, 91, also has a tongue 90 therearound extending into but not touching a groove 99 in the adjacent ring member.

As previously stated, air is brought in between the electrodes and the ring members, and between ring members. To this end an air inlet passageway 102 is provided communicating with an air header 103 which has peripherally spaced bores 104 communicating with the exterior of the ring member. From thence air passes around the side of the ring member, or between ring members, into the arc chamber. The dark lines along the rings of the heat shield may represent ceramic-sprayed walls.

A fluid inlet 107 is provided communicating with the passageways back of the copper jacket of ring 92. It will be understood that ring 92 also has an air inlet corresponding to the inlet 102 for ring 91, but since the air inlet for ring 92 must of necessity be in a different radial plane than the fluid inlet 107, it is not shown for convenience of illustration in the cross section illustrated. Likewise, it will be understood that with regard to the passageways 94 of ring 91, there is a fluid inlet therefor not shown since it must of necessity not be in the particular plane selected for illustration.

In the rings 91 and 92, fluid may flow through two substantially semicircular paths around the rings, and there are fluid outlets for each ring which may be disposed substantially 180° from the fluid inlet of each ring. The outlet for ring 92 is shown at 89.

It will be noted from observing FIGURE 1 that air forced in the gap between the rings 91 and 92, between ring 91 and electrode 12, and between ring 92 and electrode 13, forces the arc 16 to move outwardly or away from the electrodes toward the center of the arc chamber 20.

Two annular ring members 111 and 112 are disposed between electrode 11 and electrode 12. These ring members are similar to the aforedescribed ring members 91 and 92, the axes of ring members 91 and 92 are coaxial with that of electrode 11 and may be thought of as being perpendicular to the planes of the rings, whereas the axes of ring members 111 and 112 are coaxial with that of electrode 11 and may be thought of as being coaxial with the axes of the electrodes 12 and 13. Each of the ring members 111 and 112 is seen to have a copper jacket portion, to have passageways near the jacket portion for the flow of a cooling fluid, these passageways communicating with fluid inlet means, not shown for convenience of illustration. Furthermore, each of the rings 111 and 112 has means for bringing air or gas under pressure and admitting the gas into the arc chamber by a path between rings 111 and 112, a path between ring 111 and electrode 11, and a path between ring 112 and electrode 12, gas inlets, gas headers, and gas passageways similar to those described in connection with ring 91 being provided.

Oppositely disposed to the annular ring members 111 and 112 are two ring members 113 and 114 shaped similar to ring members 111 and 112, spacing electrode 14 from electrode 13. Each of the ring members 113 and 114 is seen to comprise a copper jacket, to have a main body portion having a plurality of grooves therein forming fluid flow passageways, and each of the ring members has a fluid inlet and a fluid outlet passageway communicating with these grooves, all of these fluid inlet and fluid outlet passageways not being shown for convenience of illustration. Fluid inlet passageways for ring 114 are shown at 136 and 137. Other passageways may be similar to fluid inlet 107 and fluid outlet 89 already described but may extend over at least a portion of the length thereof at an oblique or 90° angle so as to reach the surface of the arc heater at a point away from the exhaust nozzle. Furthermore, air or other gas is admitted between rings 113 and 114, between ring 113 and electrode 114, and between ring 114 and electrode 13, air inlet means similar to that described in connection with ring 91 being provided.

It will further be understood that annular electrical insulating members 117, 118 and 119 are protected from direct radiation from the arcs in chamber 20 by optical baffling including tongues on electrodes 13 and 14 and a tongue on one of the rings 113 or 114 extending into but not touching a corresponding groove in the other ring, these tongues and grooves not being shown for a convenience of illustration. Likewise with respect to the aforementioned rings 111 and 112, it will be understood that annular insulating members 121, 122 and 123 are protected from direct radiation from the arcs by tongues on the electrodes 11 and 12 extending into but not touching adjacent grooves in the rings, and also a tongue on one ring extending into but not touching an adjacent groove on the adjacent ring, these tongues and grooves not being shown for simplicity of illustration.

As previously stated, the arc heater includes exhaust means for exhausting heated gases from the chamber through an exit nozzle generally designated 125. The nozzle member 125 is fluid-cooled by fluid flowing in passageway 126 which communicates at one end thereof with an annular fluid header 127 and which communicates at the other end thereof with fluid header 128, headers 127 and 128 having fluid inlet and outlet means therefor, not shown for convenience of illustration in the selected cross-section.

In the operation of the apparatus of FIG. 1, as previously stated electrodes 11, 12, 13 and 14 are energized from a three-phase source to produce the three arcs 15, 16 and 17. Field coils 23, 34, 38 and 27 are energized by direct currents of the proper polarity to set up magnetic fields which cause the arcs to rotate in substantially annular paths within the arc chamber 20. Fluid is supplied to all of the fluid-cooling passageways, and the warm fluid is conducted therefrom, taking with it some of the heat flux produced within the chamber. Air or other gas under pressure is admitted between rings of the heat shield members, between the rings and the adjacent electrodes, and this air is heated and passes through the exhaust vent 129 of the nozzle 125.

It will be readily understood by those skilled in the art that numerous electrical insulators are required to provide electrical isolation between the various electrodes and heat shield rings and the remainder of the structure. Likewise, a large number of O-rings are provided at various points in the structure seated in annular grooves, to provide sealing engagement between the various parts of the apparatus, these O-rings being disposed in annular grooves provided to receive them, the O-rings and the grooves not being shown for simplicity of illustration.

To summarize some of the advantages of the apparatus of FIG. 1, it should be noted that the four D-C field coils are centrally located in each electrode. By this means there is produced a field flux direction parallel to the electrode arc contact surface. This assures that the arc which orthogonally meets the electrode will be rapidly moved over the electrode surface area. Furthermore, by utilizing coils closely spaced to where the magnetic flux is required, relatively high flux magnitudes are obtained at reasonable levels of ampere-turns per coil.

In FIG. 1 the working fluid, normally air, is introducted between all faces where insulation integrity is required. Cold air introduction between heat shields provides that during extended operation, contaminant deposit on the inter-heat shield insulation is reduced and the arcing current is not short-circuited through the insulation configuration. As previously stated, in FIG. 1 the same amount of air is directed through each arc, and the cold air passes only once through each arc. From the standpoint of presenting a load with balanced phases, this arrangement is superior to a prior art device in which one arc heats cold air while another arc heats air which has already been heated. This avoids an unbalanced load condition which might be produced as the arc is aerodynamically or magnetically forced toward the axis of the heater configuration, since gas velocity is not constant along the axis but increases toward the nozzle.

For three-phase operation if desired electrodes 11 and 14 of FIG. 1 may be shorted, and each of them handles one-phase current. The larger electrodes 12 and 13 each handles two-phase currents. Thus, the arc contact losses per unit area are substantially the same for all electrodes. In FIG. 1, the water-cooled electrode and heat shield surfaces are removable from the back-up structure in many cases, thereby reducing the replacement cost. To insure high heat removal capabilities, the thickness between the inner metal surface facing the arc and the face in contact with the coolant is reduced. In these electrodes the coolant flow direction is perpendicular to the arc path so that as the arc moves it is continually exposed to water not previously heated by the arc. One typical arc heater design has a heat removal capacity of about 20 million B.t.u./hr. ft.$^2$.

Certain of the air input passages may be employed for introducing reagents where it is desired to use the arc heater for chemical synthesis.

It is further noted that the nozzle is so located as to view little of the actual arcs within the arc chamber 20. Since the convective heating load near the nozzle throat is very high, the less radiation the nozzle views the better since such radiation adds to the heat flux which has to be removed by the water in the passageways in the nozzle.

The apparatus of FIG. 1 can be used for single phase AC or direct current operation by striking arcs between electrodes 11 and 14, 12 and 13, 11 and 12, or 13 and 14. If the arc is located between electrodes 11 and 14 all cold gas passes through the annular arc path. This particular arrangement gives high insulation capability between electrodes. Operation which produces an arc between electrodes 12 and 13 gives high current capability but lower voltage capability.

Means is provided for admitting cold air near the nozzle throat while high pressure, high temperature arc heater operation is desired. This means includes an air header 130 communicating with an annular passageway 131, air being exited around the nozzle throat through the annular space 132.

Some of the backing-up rings of FIG. 1 may be composed of plastic to provide insulation.

Bolts, not shown for simplicity of illustration, pass through the assembly of FIG. 1 to hold the parts together.

Particular reference is made now to FIGS. 2A and 2B which taken together show a cross-sectional view through an arc heater according to a second embodiment of our invention. In FIGS. 2A and 2B the arc chamber is generally designated 140 and is formed by means including four similar electrodes generally designated 141, 142, 143 and 144. Generally speaking the arc heater of FIGS. 2A and 2B is seen to comprise left to right, an end plate 146 seated in an annular groove 147 in an additional end plate 148 of larger diameter. End plate 146 is securely fastened to end plate 148 by bolts, not shown for convenience of illustration. The end plate 146 is seen to have a bore 149 therethrough, which is normally closed by an end cap 150 having a flange portion 151 and an elongated portion 152 which extends into the opening 149 and seals the same. The end cap may be removed to open a passageway through the opening 149, and the passageway may be used for gas pressure sensing in the arc chamber 140, or the passageway may be used for starting the arc by inserting ionized gas or a fuse wire into the arc heater. Flange 151 is bolted to the end plate 146 while the heater is in use.

Adjacent the end plate 148 is an end heat shield member generally designated 154, which is mounted upon and supported by a ring member composed of electrically insulating material designated 156. Adjacent the ring member 156 and the end heat shield 154 is a first electrode 141, and disposed adjacent the electrode 141 on the other side thereof is a portion of the heat shield generally designated 158 and including two annular rings 161 and 162 which are mounted upon and supported by an annular ring 164 composed of electrically insulating material. Disposed adjacent the annular ring 162 of the heat shield and annular ring 164 of insulating material is the second electrode 142, and on the other side thereof is an additional portion of the heat shield including annular rings 167 and 168 enclosed by an annular ring of insulating material 169. Adjacent the annular ring 168 of the heat shield and annular insulating ring 169 is the third electrode 143 having on the other side thereof an additional portion of the heat shield including annular rings 171 and 172 enclosed by an annular ring of electrically insulating material 173, and disposed adjacent ring 172 of the heat shield and ring 173 composed of electrically insulating material is the fourth electrode 144. On the other side of the electrode 144 is an additional end heat shield generally designated 175 supported and enclosed by a ring 176 composed of electrically insulating material. Adjacent the ring 176 and the end heat shield 175 is an end plate 178 having a large aperture 179 therethrough to receive the nozzle means. Mounted upon the end plate 178 is an additional end plate 181 firmly secured to end plate 178 by peripherally-spaced bolts, not shown for convenience of illustration. The end plate 181 is threaded on the internal surface thereof and receives in threaded engagement therein a nozzle generally designated 182.

The entire arc heater structure is clamped together by peripherally-spaced insulation-covered bolts disposed around the surface A of end plate 148 and extending to and extending from end plate 178, with the peripherally-spaced nuts disposed around the surface B of end plate 178; these bolts are not shown for convenience of illustration.

The aforementioned end plate 148 has a bore 184 therethrough, and the aforementioned end plate 146 has an annular groove in the surface thereof adjacent end plate 148, this groove or bore being shown at 185. Seated in this bore and groove is an end plug 187.

As will become more clearly apparent hereinafter, all surfaces within the arc chamber which are exposed to direct radiation from one or more of the arcs are fluid-cooled. To this end the end plug 187 has a cone-shaped passageway 188 therein for the flow of cooling fluid. This passageway 188 communicates at the flaring end thereof with a plurality of peripherally-spaced holes, two of these holes being shown at 189 and 190, the holes, including holes 189 and 190, communicating with an annular fluid header 191 in the end plug 187, the fluid header 191 being in alignment with fluid header 192 in the adjacent wall of end plate 148. The annular fluid header 192 communicates with a fluid exit passageway 193 passing through the end plate 148. Fluid is brought to the passageway 188 of end plug 187 by being admitted through a fluid inlet passageway 194 shown in dashed-lines because the inlet passageway is not within the plane of the cross-section. Passageway 194 communicates with an annular groove 195 around which fluid flows in two semi-circular paths, entering the passageway 196 thence entering passageway 197, thence entering annular fluid header 198, thence flowing through a plurality of radially-spaced slanting passageways, two of these being shown at 199 and 200, to annular fluid header 201 which communicates with the passageway 188. It should be understood that coolant flow direction can be reversed so that any inlet may become an outlet and vice versa.

The aforementioned end heat shield generally designated 154 is spaced from and electrically insulated from the end plate 148 by an electrically insulating ring member 203; ring member 203 and other similar ring members to be described hereinafter may be composed of Teflon or mica or other insulation. Some of the gas to be heated may enter the chamber 140 through the space between end plug 187 and end heat shield 154. To this end, a gas manifold 205 is provided, having a plurality of peripherally-spaced bores communicating therewith, two of these bores being shown at 206 and 207; thence gas flows from bores 206 and 207 through the annular space 208, thence through the space between the tongue 209 on the heat conductive surface 210 of end plug 187 and the adjacent groove 211 in the end heat shield 154, and thence through the space 212 into the arc chamber 140.

On the other side of the gas manifold 205 there are also a plurality of peripherally-spaced bores, two of these being shown at 213 and 214, and thence gas passes through the annular space 215 into the arc chamber 140. It is noted that the surface of the end heat shield has an annular tongue 216 for optically baffling the insulating ring 217.

End heat shield member 154 is seen to include an outer jacket wall portion 219 having a plurality of fluid flow passageways 220 therethrough, and a substantially solid interior portion 221 having a fluid inlet passageway 222 therein communicating by radially-spaced bores around the passageway with the aforementioned passageways 220, the radially-spaced bores being shown at 224, some of the bores being in the plane of the cross-section; bores 224 may be drilled holes, but they are not all in the same plane; one-half of the bores may be in the plane of the section if desired, and the other half may be in a plane rotated 5° or 10°. It is seen that the fluid inlet passageway 222 in end heat shield member 154 communicates with a fluid inlet passageway 226 passing through the aforementioned ring of insulating material 156.

Electrode 141 is seen to include a substantially solid ring member composed of metal, the member being designated 228 and having an aperture 229 for receiving a field coil housing 230 having a field coil 231 therein. Spaced from the interior ring member is a surface composed of a highly heat-conductive material such as copper, with the space in-between forming a plurality of fluid flow passageways 233, the copper surface being designated 234; at one end thereof the fluid flow passageways 233 communicate with an annular fluid header 236 which it is understood has fluid inlet or fluid outlet means communicating therewith, the fluid outlet or inlet means not being shown in the cross-sectional plane selected for illustration. At the other end of the fluid flow passageways 233 communicate with a fluid inlet or outlet header 237 which it is understood communicates with a fluid inlet or fluid outlet passageway, not shown for convenience of illustration. The surface 234 of highly heat conductive material includes two tongues 239 and 240 for optically baffling insulating rings in a manner previously stated.

The field coil generally designated 231 is seen to be composed of hollow conduit, preferably square in cross-section, with a fluid passageway 242 therethrough, and to include a number of turns 243, electrically insulated from each other by insulating jackets 244 surrounding the conduit. Leads 245 and 246 to energize the field coil pass through an opening 247 in the electrode back-up structure.

It will be understood that each of the electrodes 141, 142, 143 and 144 has electrical terminal means thereon adapted to be connected to a source of potential, which extends beyond the normal cylindrical boundary of the arc heater for bringing current to produce and sustain an arc, these terminal means not being shown for convenience of illustration. The electrodes are preferably connected to a three-phase source of potential to produce three arcs, one arc being between the electrodes 141 and 142, one arc being between the electrodes 142 and 143, and one arc being between electrodes 143 and 144. If desired, electrodes 141 and 144 may be connected to the same terminal of a three-phase source of potential.

Air or gas may be admitted to the arc chamber 140 at a total of 13 different places. Particular reference is made now to the heat shield rings 161 and 162; these rings are somewhat similar to the rings described and claimed in the copending application of A. M. Bruning and C. E. Le Row, Jr., for "Water Cooled Arc Heater Apparatus and Heat Shield for Use Therein," Ser. No. 631,456, filed Apr. 17, 1967, which is a continuation-in-part of application Ser. No. 340,220, filed Jan. 27, 1964, now abandoned and assigned to the assignee of the instant invention. Each ring may include a relatively solid interior portion 249 with an outer jacket portion composed of a highly heat conductive material such as copper, the jacket portion being designated 250; the body portion 249 has a plurality of annular grooves 251 therein throughout which a cooling-fluid flows. Each ring has a fluid inlet header such as that shown at 252 communicating with the passageways, and a fluid outlet heater for that particular ring may be disposed 180° around the periphery the arc heater, so that water flows in two semi-circular paths through the passageways 251. In addition, each pair of rings may have a gas manifold 254 associated therewith with a gas passageway 255 communicating with a larger gas passageway extending parallel to the longitudinal axis of the arc heater and designated 256; gas passageway 256 opens into a gas input 257. Gas from the gas manifold 254 enters the arc chamber 140 by way of two series of spaced bores around the periphery of each of the two rings, these bores being shown at 261, 262, 263 and 264, and thence the gas passes through spaces 265, 266, and 267 into the arc chamber 140. It is further noted that insulating ring members 268 and 269 are optically baffled by a tongue and groove arrangement of the two ring members of the heat shield. Electrical insulating ring 259 is optically baffled by a tongue and groove arrangement on adjacent surfaces of rings 161 and 162. The insulating ring members 268 and 269 insulate the ring members from the adjacent electrodes, and as previously stated ring member 164 is composed of electrically insulating material. Electrically insulating ring member 259 insulates ring members 161 and 162 from each other. As previously stated, each ring has a water inlet and a water outlet 180° apart. Water follows two semi-circular paths. The inlets and outlets of the various rings are displaced from each other radially.

As previously stated, many of the small insulating rings are composed of Teflon or other suitable material such as mica.

As previously stated, the electrodes are electrically insulated from each other and are electrically insulated from the end heat shields from all adjacent heat shields and from the end plates.

Electrodes 142, 143 and 144 are subs'antially similar to the aforedescribed electrode 141 and need not be described in detail. In fact, one of the advantages of this embodiment of our invention is that identical electrodes may be employed, thereby reducing the number of spares which must be carried and making it easy to repair the arc heater in case of damage.

Heat shield rings 167, 168, 171 and 172 are substantially similar to the aforedescribed heat shield rings 161 and 162 in that all of the heat shield rings have fluid flow passageways back of a jacket of highly heat conductive material such as copper, the fluid flow passageways communicating with fluid inlets and fluid outlets. In addition, gas is admitted between ring member 167 and electrode 142, between ring members 167 and 168, between ring member 168 and electrode 143, between electrode 143 and ring member 171, between ring member 171 and ring member 172, between ring member 172 and electrode 144, between electrode 144 and the end heat shield generally designated 175, and between end heat shield 175 and the adjacent surfaces of the nozzle generally designated 182, making a total of 13 gas inlets. These gas inlets may, generally speaking, comprise a plurality of peripherally-spaced bores communicating with gas headers having gas inlets extending from the outside of the arc heater.

Whereas the invention has been described with respect to two heat shield rings between each pair of adjacent electrodes, it will be understood that the number could be increased to for example three to thereby lengthen the arcs between the various electrodes.

It is seen that the arcs 271, 272 and 273 are blown toward the center of the arc chamber by air coming inbetween the electrodes, and between the ring members of the heat shield.

Referring more particularly to the electrode structure of electrodes 143 and 144, a passageway for flow of water is shown in more detail. It is seen that cooling fluid for electrode 143 enters by fluid inlet or outlet 274, thence passes by an angularly-shaped but not circumferentially-continuous passageway 275 to a fluid inlet header 276 communicating with the passageways for cooling 277 near the arcing surface of electrode 143 at one end thereof; the other end of passageways 277 communicate with a fluid header 278 connected by way of a plurality of peripherally-spaced bores 279 with an annular fluid header 280 communicating with the passageways for cooling fluid 281 near the arcing surface of electrode 144, which passageways 281 communicate at the other end thereof with an annular fluid header 282 opening into slanting passageway 283 and thence into water outlet or inlet 284.

A similar arrangement is provided for utilizing one fluid path to cool electrodes 141 and 142.

The end heat shield member 175 is substantially similar to the aforedescribed end heat shield member 154 and will not be described in great detail. Gas enters the space 286 between end heat shield member 175 and the adjacent nozzle surface of nozzle 182, gas flowing through the space 287 from gas inlet means not shown for convenience of illustration. It is seen that the nozzle 182 includes a conical-shaped passageway 288 for the flow of cooling fluid, with a flaring lip portion 289, and that the surface of the nozzle exposed to heat of radiation is composed of a highly heat conductive material such as copper, this surface being shown at 291. The surface 291 has an annular tongue 292 extending therefrom for optical baffling purposes. Tongue 292 extends into an annular groove, but does not touch end heat shield 175. Cooling fluid for the passageways 289 and 288 enters by water inlet 294 in end plate 178 and thence the fluid in water inlet 294 passes after entering annular fluid header 297 through passageways 295 and 296 and flows into passageway 289, and into an annular fluid header 298 and thence into passageway 288. Thence fluid from passageway 288 flows through passageway 299 to an annular fluid header 300, and thence leaves the arc heater by way of water outlet 301. The nozzle member 182 is secured in position by threads 302 which threadedly engage the nozzle member with end plate 181 which is bolted to end plate 178 which is bolted by bolts passing through the entire structure to the end plate 148. As previously stated, gas entering through the passageway 286 helps to cool the nozzle throat 303.

For high heat removable capability the thickness between the inner metal surface facing the arc and the face in contact with the coolant has been reduced to a minimum. As previously stated, in FIGS. 2A and 2B all electrodes are identical and the basic size of all heat shields except the end heat shields is identical. Another advantage offered by the embodiment of FIG. 2 is that larger diameter exit nozzles can be utilized. In FIG. 2, the electrodes, heat shields, and other structural parts form the pressure vessel of the arc heater proper.

Whereas we have shown and described our invention with respect to two embodiments thereof which give satisfactory results, it should be understood that the foregoing written description and the drawings are illustrative only and should not be interpreted in a limiting sense.

We claim as our invention:

1. Arc heater apparatus comprising, in combination, a first annular electrode, a second annular electrode of larger inner diameter than the first annular electrode and disposed coaxially therewith and coplanar therewith, a third annular electrode of an inside diameter similar to that of the second annular electrode and spaced therefrom and coaxial therewith, and a fourth annular electrode of a diameter corresponding to that of the first annular electrode, the fourth annular electrode being mounted coaxially with the first annular electrode and spaced therefrom and coplanar with the third annular electrode, electrical means for energizing the first, second, third and fourth annular electrodes to produce a plurality of arcs therebetween, first, second, third and fourth field coil means disposed in the first, second, third and fourth annular electrodes respectively, the field coil means producing magnetic fields which cause the arcs to rotate in substantially circular paths, heat shield means including at least one annular heat shield ring disposed between first electrode and the second electrode and delectrically insulated from both electrodes, other heat shield means including at least one annular heat shield ring disposed between the second electrode and the third electrode and electrically insulated from both of said second and third electrodes, and further heat shield means including at least one annular heat shield ring disposed between the third electrode and the fourth electrode and electrically insulated from the third and fourth electrodes, the central space between all of the electrodes and all of the heat shield means forming an arc chamber, all of the first, second, third and fourth electrodes being fluid-cooled, all of the heat shield rings being fluid-cooled, means for bringing gas into the arc chamber to be heated by the arcs therein, and exhaust means for exhausting heated gas from the arc chamber.

2. Apparatus according to claim 1 additionally characterized in that the means for bringing gas to be heated into the arc chamber includes means for bringing gas inbetween the first-named heat shield means on both sides thereof between the first and second electrodes, means for bringing gas in around the other heat shield means between the second and third electrodes on both sides thereof, and means for bringing gas in around both sides of the further heat shield means between the third and fourth electrodes.

3. Apparatus according to claim 1 in which the exhaust means is additionally characterized as being fluid-cooled.

4. Apparatus according to claim 1 in which the first, second, third and fourth electrodes each includes means forming a passageway for the flow of cooling fluid near the arcing surface of the electrode, and fluid inlet header means communicating with each passageway and fluid outlet header means communicating with each passageway.

5. Apparatus according to claim 1 in which each heat shield ring has a plurality of substantially annular passageways therein near the surface thereof which is exposed to radiation from the arc in the arc chamber, and each heat shield ring includes fluid inlet means and fluid outlet means for the annular passageways of the shield ring.

6. Apparatus according to claim 3, in which the exhaust means includes a passageway therein for the flow of cooling fluid and includes fluid inlet header means and fluid outlet header means communicating with said passageway.

7. Arc heater apparatus according to claim 1 including in addition an end plug disposed near the central aperture in the first annular electrode and closing the adjacent end of the arc chamber.

8. Apparatus according to claim 7 in which said end plug is additionally characterized as being fluid-cooled and as having a passageway therein for the flow of cooling fluid, and including in addition fluid inlet means for the last-named passageway and fluid outlet means for the last-named passageway.

9. Apparatus according to claim 1 in which the field coil means are additionally characterized as being composed of hollow conduit and having the turns of each coil electrically insulated from each other.

10. Apparatus according to claim 1 in which the magnetic field coils are additionally characterized as being centrally located in each electrode.

11. Apparatus according to claim 1 additionally characterized in that the working fluid is introduced between all adjacent surfaces which are electrically insulated from each other where electrical insulation integrity is required.

12. Apparatus according to claim 1 additionally characterized in that substantially the same amount of gas to be heated is directed through each arc.

13. Apparatus according to claim 1 in which the electrodes are fluid-cooled and the heat shield rings are fluid-cooled, and the electrodes and heat shield rings are additionally characterized as being removable from the arc heater without disassemblying the upstream closure including the closure plug and without disassemblying the exhaust means.

14. Apparatus according to claim 1 in which the exhaust means is additionally characterized as being so located as to receive little direct radiation from the arcs in the arc chamber.

15. Apparatus according to claim 1 including in addition means for admitting cold air near the throat of the exhaust means.

16. Arc heater apparatus comprising, in combination, a first end heat shield, a first electrode disposed adjacent the first end heat shield and electrically insulated therefrom, first heat shield means disposed adjacent the first electrode on the other side thereof and electrically insulated therefrom, a second electrode disposed adjacent the first heat shield means and electrically insulated therefrom, second heat shield means disposed adjacent the second electrode on the other side thereof and electrically insulated therefrom, a third electrode disposed adjacent the second heat shield means and electrically insulated therefrom, third heat shield means disposed adjacent the third electrode on the other side thereof and electrically insulated therefrom, a fourth electrode disposed adjacent the third heat shield means and electrically insulated therefrom, an additional end heat shield means disposed adjacent the fourth electrode on the other side thereof and electrically insulated therefrom, the first, second, third and fourth electrodes together with the first end heat shield, the first, second, and third heat shield means and the additional end heat shield means substantially defining an arc chamber, a field coil in each electrode, and nozzle means disposed adjacent the additional end heat shield means, the nozzle means having a throat communicating with the arc member, means for energizing the first, second, third and fourth electrodes to produce a plurality of arcs within the arc chamber, and means for introducing gas to be heated into the arc chamber through a plurality of paths.

17. Apparatus according to claim 16 in which the nozzle means is additionally characterized as being fluid-cooled.

18. Apparatus according to claim 16 including in addition means for introducing cold gas into the arc chamber near the nozzle throat.

19. Apparatus according to claim 16 in which each of the electrodes is additionally characterized as being fluidized-cooled.

20. Apparatus according to claim 16 in which each of the heat shield means is additionally characterized as being fluid-cooled.

21. Apparatus according to claim 16 in which each of the field coils is additionally characterized as being composed of hollow conduit having a cooling-fluid flowing therethrough, and including means for insulating the turns in the coil from each other.

22. Apparatus according to claim 16 in which each of the heat shield means is additionally characterized as consisting of at least one annular ring having fluid flow passageways therethrough.

23. Apparatus according to claim 16 additionally characterized as including means for admitting gas into the arc chamber on each side of the heat shield means between the adjacent electrodes.

24. Apparatus according to claim 16 in which the end heat shields, the electrodes and the heat shield means are additionally characterized as forming part of the pressure vessel.

25. Apparatus according to claim 16 including in addition means for clamping the end heat shields, the electrodes and the heat shield means between a pair of end plates electrically insulated from the adjacent end heat shield means respectively.

26. Apparatus according to claim 16 additionally characterized in that the end plate at the opposite end of the arc heater from the nozzle includes a passageway which may be opened to insert pressure sensing means or to start the arc by at least one device.

27. Apparatus according to claim 16 in which the end heat shield means and additional end heat shield means are additionally characterized as being fluid-cooled.

28. Apparatus according to claim 16 in which the first, second, third and fourth electrodes are additionally characterized as having similar dimensions, and the first, second and third heat shield means are additionally characterized as having similar dimensions.

29. Apparatus according to claim 16 in which the exit diameter of the exhaust passageway through the nozzle means is large compared to the throat diameter of said exhaust passageway.

References Cited

UNITED STATES PATENTS

| | | | |
|---|---|---|---|
| 3,309,550 | 3/1967 | Wolf et al. | 315—111 X |
| 3,343,019 | 9/1967 | Wolf et al. | 315—111 X |
| 3,368,018 | 2/1968 | DeCorso et al. | 219—123 |

JAMES W. LAWRENCE, *Primary Examiner.*

R. F. HOSSFELD, *Assistant Examiner.*

U.S. Cl. X.R.

219—123; 313—161, 162; 315—111